United States Patent [19]

Miller

[11] Patent Number: 5,027,330
[45] Date of Patent: Jun. 25, 1991

[54] FIFO MEMORY ARRANGEMENT INCLUDING A MEMORY LOCATION FILL INDICATION

[75] Inventor: Robert W. Miller, Hazlet, N.J.

[73] Assignee: AT&T Bell Laboratories, Holmdel, N.J.

[21] Appl. No.: 292,085

[22] Filed: Dec. 30, 1988

[51] Int. Cl.⁵ .................... G11C 8/04; G11C 19/00
[52] U.S. Cl. .................... 365/239; 365/78;
364/200; 364/251.1; 364/244.5
[58] Field of Search ............ 365/236, 221, 219, 78, 365/239; 364/768, 788, 200 MS File

[56] References Cited

U.S. PATENT DOCUMENTS

| | | | |
|---|---|---|---|
| 3,924,245 | 12/1975 | Eaton et al. | 364/200 |
| 3,965,484 | 6/1976 | Matz et al. | 360/61 |
| 4,507,760 | 3/1985 | Fraser | 365/221 |
| 4,535,427 | 8/1985 | Jiang | 365/205 |
| 4,694,426 | 9/1987 | Mason | 365/78 |
| 4,726,019 | 2/1988 | Adelmann et al. | 370/94 |
| 4,764,888 | 8/1988 | Holden et al. | 364/788 |
| 4,829,475 | 5/1989 | Ward et al. | 365/78 |
| 4,833,651 | 5/1989 | Seltzer et al. | 365/221 |
| 4,839,866 | 6/1989 | Ward et al. | 365/236 |
| 4,864,543 | 9/1989 | Ward et al. | 365/221 |
| 4,888,739 | 12/1989 | Frederick et al. | 365/221 |

OTHER PUBLICATIONS

Webster's Third New International Dictionary, p. 1791—"Prepend".
Computer Design, Sep. 1, 1985, "System Design/Integrated Circuits", M. J. Miller, et al, pp. 83–86.

Primary Examiner—Joseph A. Popek
Assistant Examiner—Michael A. Whitfield
Attorney, Agent, or Firm—Frederick B. Luludis

[57] ABSTRACT

A first-in, first-out, memory has a random access memory (RAM) for storing a plurality of information words seriatim. The use of such memory is significantly enhanced by arranging the memory so that it calculates and outputs to respective terminals the number of RAM locations which contain information words and the number of RAM locations which are empty. Each number is outputted responsive to receipt of a respective request to do so.

9 Claims, 2 Drawing Sheets

FIFO MEMORY ARRANGEMENT INCLUDING A MEMORY LOCATION FILL INDICATION

FIELD OF THE INVENTION

The invention relates to first-in-first-out memories and more particularly relates to an arrangement for improving the use of such memories.

BACKGROUND OF THE INVENTION

A first-in, first-out dual port memory (FIFO) may be used as a communication path between a data producing process and separate data consuming process. These processes are typically independent of one another and may not even be controlled from a common clock source. That is, the two processes may be asynchronous with respect to one another. To deal with this, a FIFO employs internal read and write pointers to sequence through its array of memory locations. A FIFO also employs circuitry to track the difference in the values of the internal read and write pointers and output signals (flags) when the difference indicates that the memory is empty (E), half-full (HF) and full (F), respectively.

The information provided by the aforementioned flags is, however, not sufficient to optimize the use of a FIFO as a communication path between asynchronous processes. The reason for this is that during the intervals between the times that the aforementioned flags are asserted the data producing and consuming processes have no way of knowing the actual number of memory locations available for the storage of data packets. Thus, during the interval following the assertion of the half-full flag, for example, the data producing process checks the status of the full flag each time it stores a data packet to determine if the FIFO has become full. The data producing process does this because the FIFO rejects any attempt to store data in its memory following the assertion of the full flag. An attempt to write data in the FIFO memory following the assertion of the full may result in losing that data. Consequently, the data producing process incurs a processing penalty as result of checking the full flag each time it stores a data packet in the FIFO.

SUMMARY OF THE INVENTION

The inefficiency associated with prior FIFO memory devices is obviated by arranging a FIFO memory to output an actual count of the number of memory locations available for write operations or the number of memory locations containing data. The data producing process may thus determine beforehand whether the number of available memory locations in the FIFO is sufficient to accommodate a particular message, thereby relieving the data producing process from having to check the full flag following each write operation.

DETAILED DESCRIPTION

Figure 1:
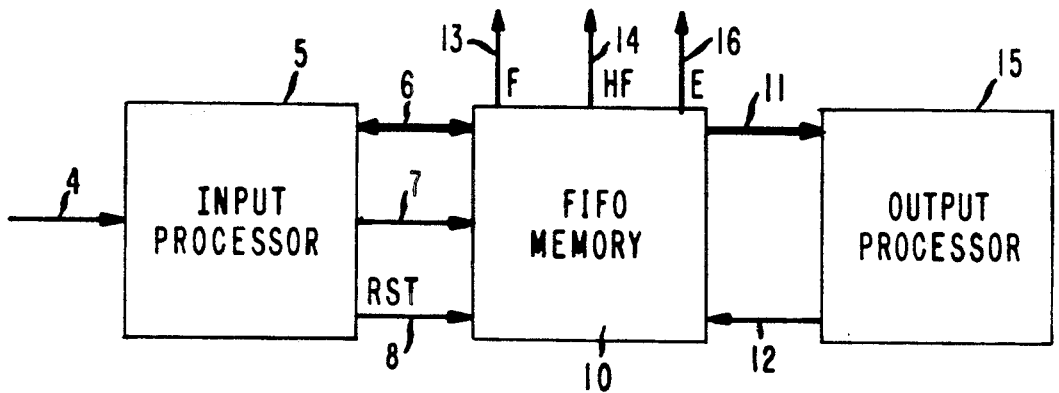
FIG. 1 shows a broad block diagram of a system in which a FIFO is used to interface a data producing process with a data consuming process.

Referring to FIG. 1, there is shown a FIFO memory 10 connected to an input processor 5 (data producing processor) via input data bus 6 and connected to an output processor 15 (data consuming processor) via an output data bus 11. Either processor 5 or 15 may be a digital computer, in which processor 5 receives from bus 4 information that is to be stored in FIFO 10. The information may be received as a message comprising a plurality of information words, in which the words are stored in FIFO 10 in the order that they are received. After the words of a message have been stored in FIFO 10, they are available for retrieval by output processor 15. When the message is retrieved from FIFO 10, the first information word stored therein is read out first. That is, a first-in-first-out queue is realized using FIFO 10.

The use of FIFO 10 may also be thought of as being a circular storage device. Thus, if the number of information words that may be stored in FIFO 10 is denoted by N, the information words are stored sequentially in FIFO 10 memory locations $0, 1, 2, \ldots, N-1$, respectively. After the location with address $N-1$ has been filled, the next location to be filled will have address 0. Accordingly, successive locations can be addressed using modulo N arithmetic, in which it is FIFO 10 which supplies the write and read addresses, rather than input and output processors 5 and 15, respectively. For example, all that input processor 5 needs to do to store a word in FIFO 10 is to enable a write lead (WE) shown as part of multilead cable 7 and place the word on bus 6. FIFO 10 responsive thereto stores the word at the next available memory location. Similarly, all that output processor 15 needs to do to read a word out of FIFO 10 is to enable a read lead (RE) shown as part of multilead cable 12. FIFO 10 responsive thereto unloads from its memory the next word to be read therefrom and places the word on output data bus 11 for receipt by output processor 15.

FIFO 10 thus maintains a write pointer register which contains the address of the next available location to be filled. FIFO 10 increments this register following the writing of a word in its memory. It also maintains a read pointer register which contains the address of the next location that is to be read. FIFO 10 increments this register following the reading of a word from its memory.

It is seen from the FIG., that input processor 5 may be arranged to generate on lead 8 a reset signal operative for resetting the aforementioned pointers and other circuitry contained in FIFO 10. Such a reset signal may be generated as a result of, for example, a so-called initialization sequence.

As mentioned above, FIFOs are typically arranged to assert either an E, HF or F flag whenever its memory is empty, half-full or full, respectively, as shown in the FIG. The way in which a FIFO may be arranged to generate such flags is well-known and will not be discussed herein. However, it suffices to say that such flags are generated as a function of the contents of the read and write pointer registers, as mentioned above. It is seen from the FIG. that the E, HF and F flags are supplied via leads 13, 14 and 16, respectively. These leads may be connected to both input processor 5 and output processor 15 either directly or via a flag control circuit. Thus, the system may be arranged so that both processors 5 and 15 know when the FIFO memory is either empty, half-full or full. However, as mentioned above, during the intervals between the assertion of those flags, neither processor 5 nor 15 know the actual number of memory locations available for the storage of information words or the number of memory locations that contain information words.

This problem is handled by arranging FIFO 10 to output via bus 6 the number of memory locations available for the storage of information words and to output via bus 11 the number of memory location that contain information words responsive to respective requests. (Hereinafter, the term "unfilled memory locations" will be taken to mean "memory locations available for the storage of information words" and the term "filled memory locations" will be taken to mean "memory locations that contain information words.")

Figure 2:
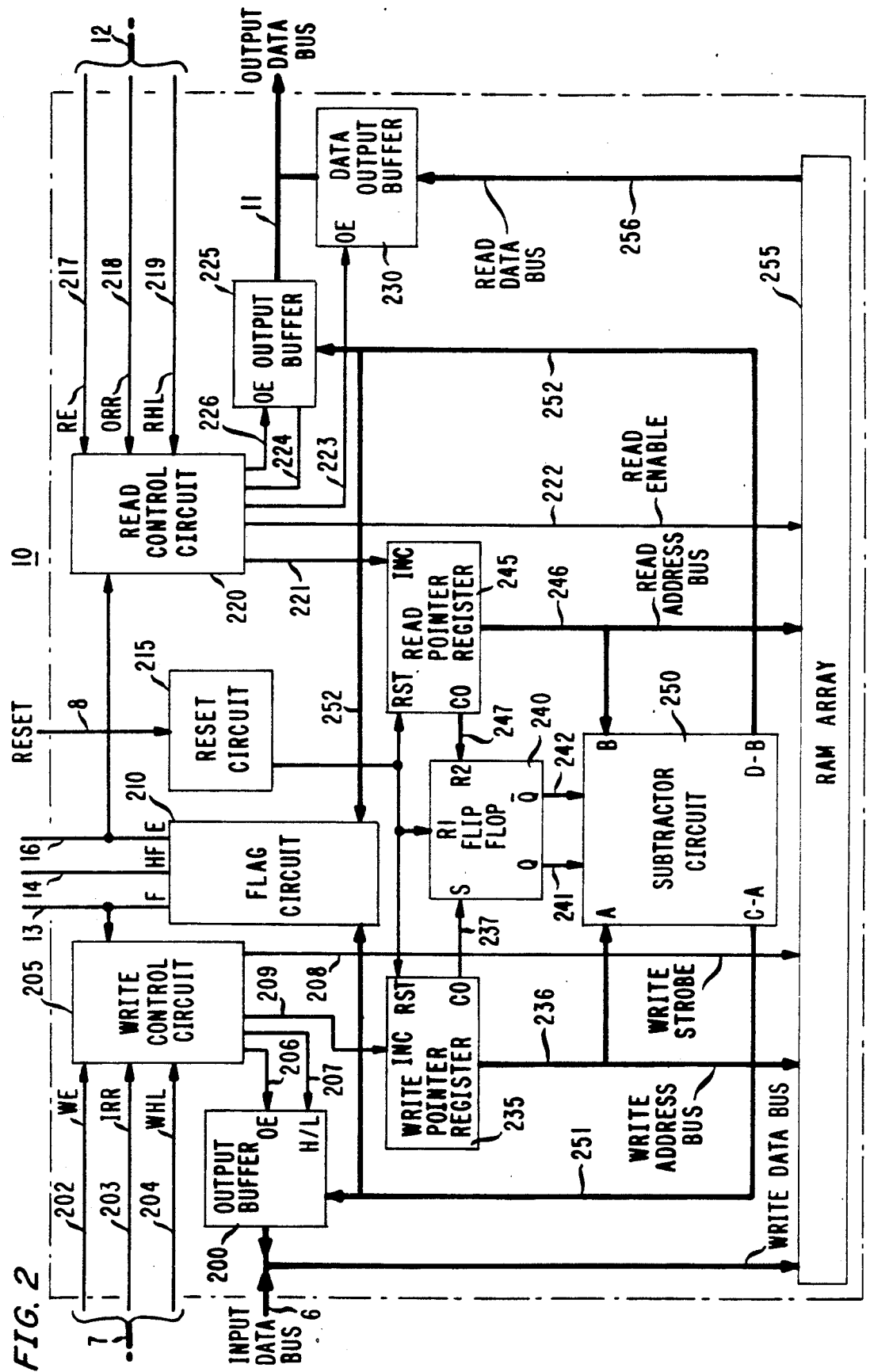
FIG. 2 shows a block diagram of a FIFO memory in which the present invention is illustratively implemented.

Turning then to FIG. 2, there is shown FIFO 10 arranged to implement the invention. Specifically, FIFO 10 includes a pair of multibit output buffers 200 and 225. Buffer 200 comprises a number of register circuits that are used to "latch in" the information appearing on bus 251 and present it to write data bus 6, in which the information is indicative of the number of unfilled RAM memory 255 locations. Buffer 225 is also comprised of a number of register circuits that are used to latch in the information appearing on bus 252 and present it to read data bus 11. Both of these numbers are generated by subtractor circuit 250 using the write address supplied by write pointer register 235 via bus 236 and the read address supplied by read pointer register 245 via bus 246. As mentioned above, the write pointer register 235 is incremented following a write operation and the read pointer register 245 is incremented following a read operation. (Registers 235 and 245 are thus counter circuits whose outputs are respective RAM 255 addresses.)

Input processor 5 stores an information word in RAM 255 by placing the word on bus 6 and asserting write enable (WE) lead 202 of multilead cable 7. Write control circuit 205 responsive to the assertion of the WE pulse generates a strobe signal on lead 208 presented to RAM memory 255. RAM 255 responsive to the strobe pulse stores the word appearing on bus 6 at the memory location identified by the address appearing on bus 236. Thereafter, responsive to the "de-assertion" of the WE enable, write control circuit 205 increments write pointer register 235 via lead 209, the value of the increment being, for example, a binary one represented by +5 volts. Similarly, output processor 15 reads an information word out of RAM 255 by placing a read enable pulse (RE) on lead 217 of multilead cable 12. Read control circuit 220 responsive to the assertion of the RE pulse generates an enable pulse on lead 222 presented to RAM 255. RAM 255 responsive to the enable pulse places on read data bus 256 the contents of the memory location whose address currently appears on bus 246, the address being supplied by read pointer register 245. The information word appearing on bus 256 is buffered and outputted to data bus 11 by output buffer 230 responsive to a read control circuit 220 enable signal appearing on lead 223. Thereafter, read control circuit 220 responsive to the "de-assertion" of the RE pulse increments read pointer register 245 via lead 221, thereby causing the latter to place on bus 246 the address of the next RAM 255 memory location that is to be read.

It is seen from FIG. 2, that the outputs of read and write pointer registers 245 and 235 are supplied to subtractor circuit 250 via busses 246 and 236, respectively. Substractor circuit 250 is a so-called modulo (N+1) subtractor and is used, in accordance with an aspect of the invention, to calculate the number of filled RAM 255 memory locations and the number of unfilled RAM 255 memory locations. The latter number is supplied to bus 251 and is stored in output buffer circuit 200 and flag circuit 210. The former number is supplied to bus 252 and is stored in output buffer circuit 225 and flag circuit 210.

The manner in which a modulo (N+1) substraction is performed is well-known and may be done in one of a number of different ways. In an illustrative embodiment of the invention, a different approach is taken to perform the subtraction. Specifically, included in FIFO 10 is flip-flop 240. Flip-flop 240 is set via carry output (CO) lead 237 whenever an increment signal on lead 209 causes the contents of write pointer register 235 to go from a maximum value to a minimum value. Similarly, flip-flop 240 is reset via carry output (CO) lead 247 whenever an increment signal on lead 221 causes the contents of read pointer register 245 to go from a maximum to a minimum value. In addition, subtractor 250 is arranged to form a value designated D by prefixing the value of the Q output received from flip-flop 240 via lead 241 to the write address (value A) received via bus 236. It is also arranged to form a value designated C by prefixing the value of the $\bar{Q}$ output received from flip-flop 240 via lead 242 to the read address (value B) received via bus 246.

(It is understood of course that in digital circuitry a flip-flop in the set state outputs a binary one and binary zero via its Q and $\bar{Q}$ outputs, respectively. A binary one may be represented by, for example, +5 volts and a binary zero may be represented by, for example, 0 volts or ground. The binary state of the Q and $\bar{Q}$ outputs are reversed when the flip-flop is reset.)

Having thus formed the C and D values, subtractor 250 may then calculate the number of RAM 255 memory locations that are filled and that are unfilled. Subtractor 250 calculates the former number by subtracting the B value from the D value (D−B), in which the result is supplied to output buffer 225 via bus 252. Subtractor 250 calculates the latter number by subtracting the A value from the C value (C−A), in which that result is supplied to output buffer 200 via bus 251.

Input and output processors 5 and 15 may read the contents of buffers 200 and 225, respectively, by merely entering a request to do so. Input processor 5 does so by pulsing the input read request (IRR) lead 203 of cable 7. Write control circuit 205 responsive to the assertion of the IRR pulse supplies to buffer 200 via lead 206 an output enable (OE) signal. Buffer 200 responsive to the OE enable signal outputs to input data bus 6 the number of RAM 255 memory locations that are unfilled (empty).

Output processor 15, on the other hand, pulses the output read request (ORR) lead 218 of cable 12 to read the contents of buffer 225. Similarly, read control circuit 220 responsive to the ORR pulse supplies to buffer 225 via lead 226 an enable signal (OE). Buffer 225, in turn, outputs to output data bus 11 the number of RAM 255 memory locations that are filled.

Thus, in accordance with the invention, FIFO 10 maintains a count of the number of RAM 255 memory locations that are filled and unfilled and presents those numbers to input and output processors 5 and 15, respectively, when requested to do so.

In some instances, RAM 255 could have many locations, for example, 4,096 memory locations ($N=4,096=2^{12}$) of 8 bits each location. Thus, pointer registers 235 and 245 would both be 12 bit counters. Substractor 250, on the other hand, would be arranged to process 13 bit numbers to account for the prepended bit, that is, $13=($base 2 log $12+1)$. In addition, buffers 200 and 225 would each contain a sufficient number of register circuits to store a 13 bit number. However, in certain instances each of the data busses 6 and 11 may be, for example, an 8 bit bus. Consequently, data busses 6 and 11 could not accommodate a 13 bit number.

To handle this situation, FIFO 10 is arranged so that, in accordance with an aspect of the invention, it outputs the number of unfilled or filled RAM 255 locations in two bytes. The first byte may comprise, for example, 8 bits, and the second byte may comprise, for example, 5 bits. It can be appreciated from the foregoing discussion, that the circuitry that is involved in outputting to bus 6 the number of unfilled RAM 255 memory locations is similar to the circuitry that is involved in outputting to bus 11 the number of filled RAM 255 memory locations. Thus, a discussion of either circuitry pertains equally well to other.

Specifically, processor 5 is arranged to change the level of the signal it supplies to lead 204 (lead 219 in the case of processor 15) to obtain either the low-order 8-bit byte or high-order 5-bit byte of the number stored in buffer 200. For example, processor 5 changes the signal on lead 204 (WHL) to a first level, e.g., 0 volts (representing a binary 0), or to a second level, e.g. +5 volts (representing a binary 1) to obtain either the 8 low-order bits or the 5 high-order bits, respectively. Thus, when processor 5 desires to obtain the number contained in buffer 200 it places a signal of 0 volts on lead 204 and pulses lead 203 (IRR). Control circuit 205 responsive to those signals changes the level on lead to 207 to 0 volts and then supplies to buffer 200 the aforementioned OE signal via lead 206. Buffer 200 responsive to the OE signal and to the low level signal on lead 207 outputs to bus 6 the 8 low-order bits of the number contained therein. Processor 5 then obtains the remaining 5 bits of the number by changing the level of the signal on lead 204 to +5 volts and again pulsing lead 203.

Figure 3:
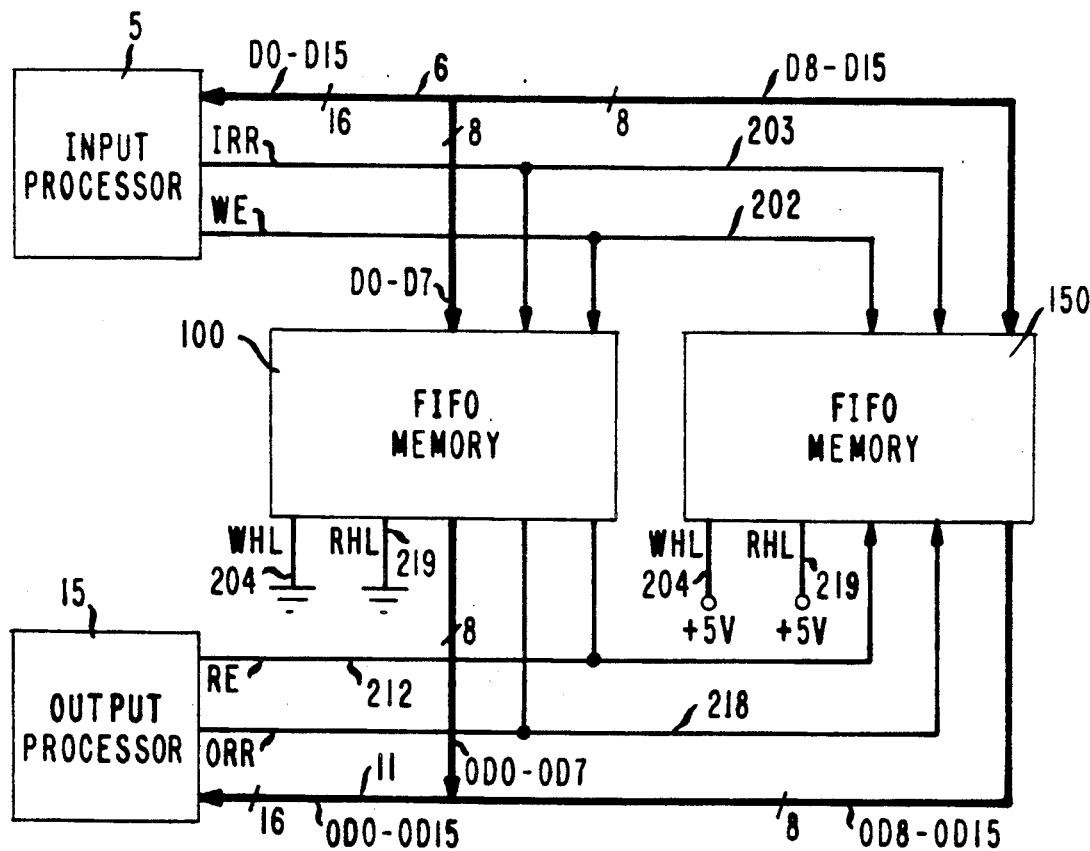
FIG. 3 shows the system of FIG. 1 modified to accommodate a plurality of FIFOs.

The notion of outputting the number of filled or unfilled memory locations in two bytes may be advantageously used in applications employing two or more FIFOs in parallel, as shown in FIG. 3. For the purpose of discussing FIG. 3, it is assumed that (a) input and output processors 5 and 15 are 16 bit processors, and (b) input and output data busses are 16 bits busses. It is also assumed that FIFO 100 and 150 are the same as FIFO 10 and that their respective RAM arrays have 4,096 memory locations of 8 bits each location. Accordingly, the fill and unfill numbers will each be 13 bits.

With the foregoing in mind, it can be appreciated that input processor 5 outputs to data bus 6 a 16 bit information word. As such, neither FIFO can store a 16 bit word, since their respective RAM arrays are only 8 bits wide. To handle this problem, the input and output data busses 6 and 11 are split in conventional fashion, with the 8 low-order leads (e.g., leads D0-D7) being presented to FIFO 100 and the 8 high-order leads (e.g., leads D8-D15) being presented to FIFO 150. FIFO 100 thus stores the 8 low-order bits of a 16 bit information word while FIFO 150 stores the 8 high-order bits thereof. The number of filled and unfilled RAM locations in FIFO 100 will thus be consistent with that of FIFO 150.

However, neither FIFO can output a 13 bit number to their respective bus leads. This problem is handled in the manner discussed above by, in accordance with an aspect of the invention, arranging one FIFO to output the low-order bits of a fill or unfill number while the other FIFO simultaneously outputs the high-order bits thereof. Thus, as shown in FIG. 3, The WHL and RHL leads of FIFO 100 are connected to 0 volts (i.e., ground) to force FIFO 100 to output only the low-order bits (e.g., bits 0-7) of either the fill or unfill numbers. The WHL and RHL leads of FIFO 150, on the other hand, are connected to +5 volts to force FIFO 150 to output only the high-order bits (e.g., bits 8-12) of either the fill or unfill numbers. In addition, the IRR lead 203 of input processor 5 and the ORR lead 218 of output processor 15 are connected to both FIFOs, respectively.

Thus, when, for example, input processor 5 pulses its IRR lead, FIFOs 100 and 150 respond thereto and output to input data bus 6 the 8 low-order bits and 5 high-order bits, respectively, of the unfill number. The arrangement depicted in FIG. 3 similarly operates when output processor 15 pulses its ORR lead to obtain the number of memory locations that are filled.

The foregoing is merely illustrative of the principles of the invention. Those skilled in the art will be able to devise numerous arrangements which although not explicitly shown or described herein, embody those principles and are within its scope and spirit. For example, as discussed above, a binary one is prepended to the binary number contained in either write pointer register 235 or read pointer register 245 based on whether the value of the number contained therein went from a maximum value to a minimum value. Alternatively, the prepending of the aforementioned binary one could be based on whether FIFO 10 asserts either the full (F) or empty (E) flag, respectively. In addition, the number of FIFOs depicted in FIG. 3 could be increased to handle the case where input and output processors 5 and 15 are 32-bit processors. In such an instance, the number of FIFOs would be four and each would store an 8-bit byte of the information word. However, only FIFOS 100 and 150 would be arranged to output the fill and unfill numbers, in the manner described above.

I claim:

1. A first-in, first-out memory arrangement comprising:
   an addressable cyclic memory having N memory locations, wherein an arbitrary number of said N memory locations may be filled at any point in time, where $N>1$, and
   mean for determining said arbitrary number and a remaining number of said N memory locations that are unfilled, and responsive to external request signals, for outputting to an output terminal of said first-in, first-out memory arrangement said arbitrary and remaining numbers, in which each of said arbitrary and remaining numbers is a discrete value between 0 and N.

2. The arrangement set forth in claim 1 further comprising
   a first address pointer containing an address identifying the next location in said addressable cyclic memory at which a data word is to be stored, and
   a second address pointer containing an address identifying the next location in said addressable cyclic memory that is to be read, and wherein said means for determining includes means for calculating said arbitrary and remaining numbers as a function of the addresses contained in said first and second address pointers.

3. The arrangement set forth in claim 2 wherein said means for calculating includes means, operative prior to said arbitrary and remaining numbers being calculated and responsive to the value of the address contained in said first address pointer going from a maximum to minimum address, for prefixing to said first address pointer a predetermined value and, responsive to the address contained in said second address pointer going from a maximum to a minimum address, for removing said predetermined value from said first address pointer and prefixing said predetermined value to said second address pointer.

4. The arrangement set forth in claim 1 wherein said discrete value is represented by a predetermined number of binary bits comprising a number of low-order bits and a number of high-order bits and wherein said means for determining and outputting includes means, responsive to receipt of other external request signals, for respectively outputting the low-order and high-order bits of said discrete value to said output terminal.

5. A first-in, first-out memory system operating in conjunction with first and second processors comprising an addressable cyclic memory having a plurality of memory locations, in which an arbitrary number of said memory locations may be filled at any point in time, a first pointer register for supplying an address identifying a memory location at which a data word is to be stored, a second pointer register for supplying an address identifying a memory location which is to be read, means for incrementing said first pointer register by a predetermined value when a word is stored in said addressable cyclic memory and for incrementing said second pointer register by said predetermined value when a word is read from said addressable cyclic memory, means for forming first and second values from the addresses provided by said first and second pointer registers, respectively, for prefixing a predetermined number to said first value whenever the address contained in said first pointer register goes from a maximum to a minimum value and for transferring said prefixed number from said first value to said second value whenever the address in said second pointer register goes from a maximum to a minimum value, means for determining, as a function of said first and second values, said arbitrary number and a corresponding number of said plurality of memory locations which are empty, and means, responsive to receipt of a request signal from said first processor, for outputting to an output terminal said arbitrary number and, responsive to receipt of a request signal from said second processor, for outputting to another output terminal said corresponding number.

6. The arrangement set forth in claim 5 wherein each of said arbitrary and corresponding numbers is represented by a predetermined number of binary bits comprising a number of low-order and high-order bits and wherein said means for outputting includes means for outputting to said output terminal the low-order or high-order bits of said arbitrary number responsive to receipt of a respective first or second request signal from said first processor, and for outputting to said other output terminal the low-order or high-order bits of said corresponding number responsive to receipt of a respective third or fourth request signal from said second processor.

7. A memory arrangement comprising first and second memories each having a plurality of memory locations, a first processor connected to said first and second memories via a multibit write bus such that a predetermined number of bit leads of said multibit write bus are connected to said first memory and remaining bit leads thereof are connected to said second memory, means contained in each of said first and second memories for determining at least the number of unfilled memory locations in their respective memories, said number being the same for both of said memories and being represented by low-order bits and high-order bits, means contained in said first memory responsive to receipt of a request for outputting to the bit leads connected to said first memory the low-order bits of said number, and means contained in said second memory responsive to receipt of said request for outputting to the remaining bit leads connected to said second memory the high-order bits of said number.

8. A first-in, first-out memory arrangement comprising, an addressable cyclic memory having N memory locations, in which an arbitrary number of said N memory locations may be filled at any point in time, where $N>1$, and means for determining said arbitrary number and, responsive to receipt of an external request signal, for outputting to an output terminal of said first-in, first-out memory arrangement said arbitrary number, in which said arbitrary number is a discrete value between 0 and N.

9. A first-in, first-out memory arrangement comprising, an addressable cyclic memory having N memory locations, in which an arbitrary number of said N memory locations may be unfilled at any point in time, where $N>1$, and means for determining said arbitrary number and, responsive to receipt of an external request signal, for outputting to an output terminal of said first-in first-out memory arrangement said arbitrary number, in which said arbitrary number is a discrete value between 0 and N.

* * * * *